United States Patent [19]
Garcin et al.

[11] Patent Number: 5,827,489
[45] Date of Patent: Oct. 27, 1998

[54] V/MO/W CATALYSTS FOR THE SELECTIVE REDUCTION OF NITROGEN OXIDES

[75] Inventors: Eric Garcin, Lyon; Francis Luck, Noisy/le/Grand; Raymond Surantyn, St. Martin Du Tertre, all of France

[73] Assignee: Rhone-Poulenc Chimie, Courbevoie Cedex, France

[21] Appl. No.: 463,768

[22] Filed: Jun. 5, 1995

Related U.S. Application Data

[62] Division of Ser. No. 223,326, Apr. 5, 1994, abandoned, which is a continuation of Ser. No. 991,171, Dec. 16, 1992, abandoned.

[30] Foreign Application Priority Data

Dec. 16, 1991 [FR] France ................................ 91/15581

[51] Int. Cl.$^6$ ................................ B01J 8/00; C01B 21/00
[52] U.S. Cl. ................................ 423/239.1; 423/235
[58] Field of Search ................................ 502/354, 305, 502/309, 322, 312, 323; 432/235, 239.1

[56] References Cited

U.S. PATENT DOCUMENTS

| | | | |
|---|---|---|---|
| 4,071,601 | 1/1978 | Shiraishi et al. | 423/239 |
| 4,314,913 | 2/1982 | Darrien et al. | 252/464 |
| 4,867,954 | 9/1989 | Staniulis et al. | 423/239.1 |
| 4,921,826 | 5/1990 | Juntgen et al. | 502/180 |
| 4,929,586 | 5/1990 | Hegedus et al. | 502/217 |
| 5,037,792 | 8/1991 | Luck | 502/307 |
| 5,372,982 | 12/1994 | Hietala et al. | 502/226 |

FOREIGN PATENT DOCUMENTS

| | | |
|---|---|---|
| 0 204 064 | 1/1987 | European Pat. Off. . |
| WO 89/03366 | 4/1989 | European Pat. Off. . |
| 0 348 768 | 6/1989 | European Pat. Off. . |

*Primary Examiner*—Glenn Caldarola
*Assistant Examiner*—Thuan D. Dang
*Attorney, Agent, or Firm*—Burns, Doane, Swecker & Mathis, L.L.P.

[57] ABSTRACT

Impure gas streams containing contaminating amounts of $NO_x$, e.g., automotive exhaust fumes and industrial waste gases, are purified by contacting same, in the presence of ammonia, at an elevated temperature, with a catalyst composition which comprises an inorganic oxide support substrate having a catalytically effective amount of a metal oxide active phase deposited thereon, such support substrate comprising at least one alumina, aluminate, titanium dioxide and/or zirconium dioxide and such catalytically active phase comprising at least one vanadium oxide and/or molybdenum oxide and/or tungsten oxide, the surface of the support substrate being chemically bonded to the metals V and/or Mo and/or W and the catalyst being devoid of $V_2O_3$ and/or $MoO_3$ and/or $WO_3$ crystalline phases, and thereby selectively reducing such $NO_x$ values while minimizing the formation of $N_2O$.

18 Claims, No Drawings

V/MO/W CATALYSTS FOR THE SELECTIVE REDUCTION OF NITROGEN OXIDES

This application is a divisional of application Ser. No. 08/223,326, filed Apr. 5, 1994, now abandoned, which is a continuation of application Ser. No. 07/991,171, now abandoned.

BACKGROUND OF THE INVENTION

1. Field of the Invention

The present invention relates to novel catalysts for the selective reduction of nitrogen oxides contained in a gas stream. In particular, the present invention relates to a process for the catalytic reduction, by means of ammonia, of the nitrogen oxides present in a gas stream, employing such novel catalysts.

2. Description of the Prior Art

Many gaseous effluents, such as, in particular, automobile exhaust gases, the waste gases from boilers and other stationary combustion units, the waste gases from nitric acid production and industrial waste gases in general, contain a greater or lesser amount of nitrogen oxides, typically nitric oxide NO or nitrogen dioxide $NO_2$. Such oxides are normally designated by the term $NO_x$.

The nitrogen oxides $NO_x$ emitted into the atmosphere significantly contribute to acid rain, and are responsible, together with the hydrocarbons, for the photooxidative pollution which is very damaging to the environment.

It is therefore important to remove the nitrogen oxides $NO_x$ contained in a gas stream before discharging same into the atmosphere.

In this respect, the various national laws and regulations require that waste gases contain particularly low levels of nitrogen oxides ($NO_x$), not exceeding approximately 200 vpm (0.02%).

Thus, a large number of processes have been proposed to this art for reducing the $NO_x$ content of waste gas streams to permissible values.

For example, a catalyst for reducing the nitrogen oxides $NO_x$ contained in a gas stream to nitrogen by means of ammonia is described in FR-A-2,450,784.

This catalyst comprises a porous alumina support having a catalytically active phase deposited thereon, in an amount ranging from 0.5 to 20% by weight of catalyst. This catalyst has proven especially efficacious for the reduction of waste nitrogen oxides formed during the synthesis of nitric acid by oxidation of ammonia using oxygen. Such catalyst also presents the advantage that it can be used at relatively low temperatures, on the order of 180° C. to 250° C., providing energy savings inasmuch as the gas streams to be treated do not have to be heated. However, such a catalyst also presents disadvantages when employed for the catalytic reduction, by means of ammonia, of nitrogen oxides contained in a gas stream maintained at a temperature above or equal to 300° C.

It has been determined that, at high temperature, the reduction of nitrogen oxides $NO_x$ with ammonia in the presence of the catalyst described in FR-A-2,450,784 is accompanied by the formation of nitrous oxide $N_2O$, the presence of which is also undesirable.

Indeed, it has recently been suggested that nitrous oxide is a gas which plays an important role in the greenhouse effect and in the mechanisms of depletion of stratospheric ozone.

The presence of nitrous oxide is considered to be attributable to side reactions of the oxidation of ammonia, according to reactions of the type:

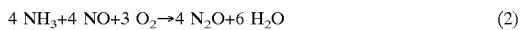

At high temperature, additional pollution ensues due to the nitrous oxide and also added consumption of ammonia via the spurious reaction (1).

SUMMARY OF THE INVENTION

Accordingly, a major object of the present invention is the provision of novel catalysts for the selective reduction of nitrogen oxides present in gas streams, by means of ammonia, at temperatures above or equal to 300° C. and advantageously ranging from 350° C. to 450° C., to provide purified gas streams devoid of such nitrogen oxides.

Another object of the present invention is the provision of novel catalysts which minimize the formation of nitrous oxide during the selective reduction of nitrogen oxides at high temperature.

Still another object of this invention is the provision of novel catalysts which avoid the excessive consumption of ammonia relative to the typical stoichiometry, which is on the order of one mole per mole of $NO_x$ reduced, when the reduction of nitrogen oxides $NO_x$ is conducted at high temperature.

Briefly, the present invention features novel catalysts for the reduction, with ammonia, of the nitrogen oxides present in gaseous streams comprised thereof and carried out at a temperature above or equal to 300° C., such catalysts comprising a support substrate of at least one of the inorganic oxides selected from among alumina, aluminates, titanium dioxide and zirconium dioxide and a catalytically active phase of at least one of the metal oxides selected from among vanadium and/or molybdenum and/or tungsten oxides, and wherein said metal elements V and/or Mo and/or W are chemically bonded to the surfaces of such support substrate, and said catalysts being devoid of crystalline phases of the $V_2O_5$ and/or $MoO_3$ and/or $WO_3$ type.

DETAILED DESCRIPTION OF THE PREFERRED EMBODIMENTS OF THE INVENTION

More particularly according to the present invention, one of the significant properties of the subject catalysts is that the metal element M (where M represents V and/or Mo and/or W) is chemically bonded to the support substrate on which it is deposited.

While not wishing to be bound to or by any particular theory, it may be considered that the bonding between the metal element S of the support (where S represents Al and/or Ti and/or Zr) and the metal element M is likely of the S—O—M type, and that these oxides are exclusively in the form of surface $MO_4$ units of tetrahedral structure bonded to the support and oligomers of $MO_4$ and/or $MO_5$ units, these oligomers also being bonded to the support, and that the catalysts do not contain at the active phase/support interface $V_2O_5$ and/or $MoO_3$ and/or $WO_3$ metal oxide phases, which latter constitute well-crystallized phases.

The catalysts of the invention may be characterized by Raman spectroscopy under operating conditions such that thermal degradation of the catalysts is avoided under the influence of the excitation source of the spectrometer.

Under these conditions, they exhibit a spectrum with the presence of lines characteristic of vanadates, molybdates or tungstates, polymerized or otherwise, in the frequency range 850–980 $cm^{-1}$ and 220–370 $cm^{-1}$, and absence of lines characteristic of crystalline vanadium oxide at 1,000, 700, 535 and 400 cm$^{-1}$, of crystalline molybdenum oxide at 1,000, 815, 665 and 280 cm$^{-1}$ and of crystalline tungsten oxide at 810, 715 and 270 cm$^{-1}$.

Thus, it has now surprisingly been determined that catalysts exhibiting the aforementioned features, which manifest themselves in the Raman spectrum indicated, display improved catalytic performance.

A first advantage resulting from the use of such catalysts in a process for the reduction, with ammonia, of nitrogen oxides contained in a gas stream, is that they permit the nitrogen oxides to be reduced to nitrogen at high temperature while minimizing nitrous oxide formation.

Another advantage obtained by use of the catalysts of the invention is that they permit the ammonia consumption to be decreased.

According to the present invention, the subject catalysts reflect a certain distribution of the metal oxides constituting the catalytically active phase on the support, which can be alumina, aluminates, titanium dioxide TiO$_2$ and/or zirconium dioxide ZrO$_2$, known as zirconia.

By "aluminates" are intended the aluminates of divalent transition metals having a small ionic radius, preferably not exceeding 0.08 nm.

Exemplary such aluminates include zinc, nickel, cobalt, magnesium and copper aluminates.

Among the aforesaid aluminates, nickel aluminate is the preferred.

The preferred catalysts according to the invention comprise alumina or aluminates as support substrates.

It is preferred to use an alumina- or aluminate-based catalyst support whose pore volume for pores larger than 1,000 Å in diameter is greater than 25 cm$^3$/100 g, preferably ranging from 25 to 70 cm$^3$/100 g, and whose pore volume for pores larger than 300 Å in diameter is greater than 40 cm$^3$/100 g, preferably ranging from 43 to 70 cm$^3$/100 g, the total pore volume ranging from 80 to 120 cm$^3$/100 g.

The surface area of the alumina-based support is preferably at most 160 m$^2$/g, and more generally ranges from 90 to 150 m$^2$/g.

The alumina which can be employed normally possesses the γ, θ, δ and α crystalline forms, the γ, θ and δ forms generally being preponderant and the α form then occurring only in trace amounts.

When a titanium dioxide is employed, its anatase form is the preferred.

The specific surface area of the support can vary very widely from 5 to 200 m$^2$/g, and preferably from 10 to 100 m$^2$/g; its total pore volume thus advantageously ranges from 10 to 50 cm$^3$/100 g, and preferably from 20 to 40 cm$^3$/100 g.

Zirconia, in turn, possesses a specific surface area ranging from 5 to 200 m$^2$/g; its total pore volume thus advantageously ranges from 10 to 70 cm$^3$/100 g, and preferably from 20 to 50 cm$^3$/100 g.

According to the present invention, the metal oxides of vanadium, of molybdenum or of tungsten or mixtures thereof are deposited onto the support in a defined proportion in such manner that crystalline phases of the V$_2$O$_5$ and/or MoO$_3$ and/or WO$_3$ type are not formed, which corresponds to a limited proportion of the metal element relative to the specific surface area of the support.

For example, it will be appreciated that, in the case of alumina or an aluminate, the production of a catalyst satisfying this characteristic, and hence exhibiting the Raman spectrum indicated above, entails coating the alumina support with fewer than X atoms of vanadium and/or Y atoms of molybdenum and/or tungsten per square nanometer of support, with X and Y being defined by the following relations:

X less than or equal to 9
Y less than or equal to 6
X less than or equal to (1−Y/6)×9
Y less than or equal to (1−X/9)×6

The number of atoms X and Y is expressed relative to the specific surface area of the support after calcination. Said surface area is determined by measurement of the specific surface area of the "finished" or final product catalyst, expressed relative to the content of catalyst support.

The catalytically active phase according to the present invention comprises at least one metal oxide such as vanadium, molybdenum and/or tungsten oxides.

The content of active phase of the catalyst advantageously ranges from 0.01% to 50% by weight, and preferably from 0.1% to 20% by weight, relative to the total weight of the catalyst.

A catalyst which is especially preferred comprises a catalytically active phase of vanadium oxide V$_2$O$_5$ or a mixture of a vanadium oxide V$_2$O$_5$ and a molybdenum oxide MoO$_3$ or a tungsten oxide WO$_3$. A weight ratio of V$_2$O$_5$ to MoO$_3$ or WO$_3$ ranging from 1 to 0.01 is preferred.

The catalysts of the invention may be produced employing standard techniques for the preparation of catalysts.

One process well suited for their preparation is the technique of impregnation of the support with an aqueous solution containing the metal elements V and/or Mo and/or W, and then, in a following step, thermally treating the support coated with V and/or Mo and/or W.

Such process entails, in a first step, impregnating the support, in the form, for example, of beads, granules or extrudates of any shape, with a solution of a vanadium and/or molybdenum and/or tungsten precursor compound which yields the metal oxides upon calcination.

It is also possible to precipitate these compounds onto the support.

The starting material vanadium compound can be a vanadium oxide, a vanadium complex such as vanadium acetylacetonate or vanadyl oxalate, or a salt such as ammonium metavanadate or vanadyl sulfate.

The starting material molybdenum or tungsten compounds can be ammonium salts such as ammonium dimolybdate, ammonium heptamolybdate, ammonium metatungstate or ammonium paratungstate.

The impregnation solutions are generally aqueous solutions which can contain metal salts which are precursors of vanadium, molybdenum and/or tungsten oxides.

In a preferred embodiment of the invention, water-soluble salts are used.

An aqueous solution obtained by dissolving vanadium pentoxide in an oxalic acid solution is advantageously employed as an impregnation solution containing the vanadium compound.

As regards the molybdenum and/or tungsten compounds, the ammonium salts are the preferred.

The catalyst of the present invention is prepared, for example, by mixing an aqueous solution of a vanadium compound with the alumina or aluminate support in order to impregnate it, said vanadium compound being employed in proportions such that the number of vanadium atoms per square nanometer of support does not exceed 9.

In the event that a molybdenum and/or tungsten compound is also present, their proportions will be defined by taking account of the equations or inequalities indicated above.

In a second step, the thermal treatment is conducted, entailing calcining the impregnated support. However, it is desirable, though not essential, to carry out a prior drying step.

The drying is typically carried out in air, at a temperature on the order of 100° C. to 150° C., for approximately 1 to 12 hours.

A calcination operation, typically carried out under air at temperatures on the order of 300° to 800° C., and preferably on the order of 350° to 600° C., for approximately 1 to 6 hours, is then conducted.

The impregnation operation may be repeated one or more times, and may be followed each time by the calcination operation.

It is also possible to prepare the catalyst of the invention by comalaxation of the support in powder form and the vanadium and/or molybdenum an/or tungsten compounds in oxide and/or salt form, in the presence of water and optionally of an acid, for example nitric acid, or a base, for example an aqueous ammonia solution.

The paste obtained is extruded into any shape, for example cylindrical or multilobed extrudates, rings, monoliths, and the like.

The extrudates thus prepared can be optionally dried and calcined as described above.

This invention also features a process for reduction, with ammonia, of the nitrogen oxides present in a gas stream, by means of a catalyst as described above.

In such process for the removal of nitrogen oxides from the gas stream comprised thereof, the catalyst is generally introduced into a suitable reactor in the form of a fixed bed or a fluidized bed.

Typically, the gas stream to be purified according to the invention is a waste gas stream emanating from a chemical process or from a stationary combustion unit, and containing, among other species:

(i) nitrogen, (ii) oxygen, in an amount usually ranging from 1% to 10% by volume, (iii) nitrogen oxide $NO_x$, in an amount generally ranging from 0.01% to 1% by volume, (iv) sulfur oxides $SO_x$, in an amount usually ranging from 0% to 1% by volume, (v) water, in an amount generally ranging from 0.001% to 20% by volume, The catalysts of this invention are perfectly suitable for use in a process operating at a temperature above or equal to 300° C., and preferably ranging from 300° C. to 550° C. Advantageously, the temperature of the gas stream to be treated ranges from 350° C. to 450° C.

The hourly space velocity (HSV) of the gases to be treated is dependent on the temperature of the catalyst, a higher temperature permitting a greater HSV for a given result.

The HSV represents the volume of gas to be treated per volume of catalyst and per hour. It is defined at standard temperature (0° C.) and standard pressure (1 bar).

More often than not, in the abovementioned temperature ranges, the HSV ranges from 2,000 to 150,000 $h^{-1}$, and preferably from 3,000 to 100,000 $h^{-1}$.

The $NH_3/NO_x$ mole ratio is dependent on the desired depletion of $NO_x$ in the gas stream and the permissible discharges of ammonia in the treated stream, the two parameters being associated.

The selective reduction of $NO_x$ according to the invention usually requires an $NH_3/NO_x$ mole ratio of less than 1.1, and preferably from 0.8 to 1, depending on the desired degree of conversion and the $NO_x$ content of the gas to be treated.

The pressure of the gas stream to be treated favors the conversion of $NO_x$ to $N_2$.

It advantageously ranges from 1 to 20 bar, and preferably from 1 to 15 bar.

In a preferred embodiment of the process for the reduction of nitrogen oxides present in a gas stream, the amount of catalytic metal element present at the surface on the catalyst is adjusted in accordance with the operating temperature thereof.

Indeed, it has now unexpectedly been found that said amount could be decreased proportionately with an increase in the reduction temperature.

Thus, the catalyst employed will have a number of atoms X of vanadium or of atoms Y of molybdenum and/or tungsten per square nanometer which is lowered proportionately with an increase in the temperature of the gas stream to be treated.

This characteristic will be more fully described in the examples below relating to especially advantageous catalysts, namely, alumina- or aluminate-based catalysts coated with vanadium oxide. These catalysts permit, by means of ammonia, efficacious decomposition of $NO_x$ exclusively to nitrogen and water at temperatures ranging from 300° C. to 550° C., without substantial oxidation of the ammonia and without significant formation of nitrous oxide.

The acceptable level is considered to correspond to an amount of nitrous oxide formed during the reaction not exceeding 1% of the amount of nitrogen oxides $NO_x$ introduced into the reactor.

Thus, during the treatment of a gas stream not containing water, under a pressure of 4 bar absolute for a space velocity of 8,000 $h^{-1}$ and an $NO_2/NO_x$ ratio of less than 0.5 at inlet, it was found that the number X of vanadium atoms per square nanometer of alumina could be decreased proportionately with an increase in the temperature.

If the temperature is below or equal to 300° C., X is preferably less than or equal to 9.

If the temperature is below or equal to 350° C., X is preferably less than or equal to 7.

If the temperature is below or equal to 400° C., X is preferably less than or equal to 4.5.

If the temperature is below or equal to 500° C., X is preferably less than or equal to 1.

The different values of X may be adjusted if the conditions are different, namely, if water is present in the gas stream or if the pressure and the contact time are different.

Under these conditions, it will be appreciated, for example, that, for alumina and aluminates, the number X of vanadium atoms per square nanometer is less than or equal to 9 and is less than or equal to the value $X_o$, dependent on the temperature T in kelvin, on the contact time $t_c$ defined with reference to standard temperature and pressure conditions (in seconds), on the pressure P (in bar) and on the molar concentration $C_{H_2O}$ of water, the value $X_o$ being defined by the equation:

$$X_o = [-58.0 + 4.65 \times 10^4 \times 1/T] t_c^{1.58} \times p^{0.28} [1 + 5.2 C_{H_2O}]^{0.40}$$

in which $C_{H_2O}$ ranges from 0 to 0.3 mol of water per mole of gas treated; $t_c$ ranges from 0.1 to 1 second; p ranges from 1 to 15 bar; and T ranges from 580 to 800 K.

The catalyst of the invention is particularly useful for the treatment of the waste gas streams emanating as discharge from the process of preparing nitric acid by oxidation of ammonia.

It is also well suited for the treatment of any waste gas containing $NO_x$, in particular the waste gases from boilers and any other stationary combustion unit.

In order to further illustrate the present invention and the advantages thereof, the following specific examples are given, it being understood that same are intended only as illustrative and in nowise limitative.

EXAMPLE 1
Preparation of a catalyst A (according to the invention)

For the preparation of the catalyst A, an alumina was employed used in the form of beads 3 mm in diameter, having the following properties:

(a) Specific surface area=152 m$^2$/g, (b) Total pore volume=100 cm$^3$/100 g, (c) Pore volume for pores larger than 1,000 Å in diameter=27 cm$^3$/100 g, (d) Pore volume for pores larger than 300 Å in diameter= 46 cm$^2$/100 g.

100 g of this support substrate were impregnated with 100 ml of an aqueous solution of vanadyl oxalate, obtained by dissolving 17.6 g of vanadium pentoxide in an oxalic acid solution employed in a stoichiometric amount relative to the vanadium pentoxide.

After 30 min of contact time, the product obtained was dried in an oven at 120° C. for 4 hours before being calcined for 4 hours at 450° C. under air.

The catalyst A thereby prepared contained, by weight expressed with reference to the support, 15% of vanadium pentoxide distributed homogeneously within the alumina beads, equivalent to 7.7 vanadium atoms per square nanometer.

EXAMPLE 2
Preparation of a catalyst B (according to the invention)

For the preparation of catalyst B, the alumina support described in Example 1 was used.

100 g of this support were impregnated with 100 ml of an aqueous solution of vanadyl oxalate, obtained by dissolving 13 g of vanadium pentoxide in an oxalic acid solution.

After 30 min of contact time, the product obtained was dried in an oven at 120° C. for 4 hours before being calcined for 4 hours at 450° C. under air.

The catalyst B thereby prepared contained, by weight expressed with reference to the support, 11.5% of vanadium pentoxide distributed homogeneously within the alumina beads, equivalent to 5.6 vanadium atoms per square nanometer.

EXAMPLE 3
Preparation of a catalyst C (according to the invention)

For the preparation of catalyst C, the alumina support described in Example 1 was used.

100 g of this support were impregnated with 100 ml of an aqueous solution of vanadyl oxalate, obtained by dissolving 11.1 g of vanadium pentoxide in an oxalic acid solution.

After 30 min of contact time, the product obtained was dried in an oven at 120° C. for 4 hours before being calcined for 4 hours at 450° C. under air.

The catalyst C thereby prepared contained, by weight expressed with reference to the support, 10% of vanadium pentoxide distributed homogeneously within the alumina beads, equivalent to 4.8 vanadium atoms per square nanometer.

EXAMPLE 4
Preparation of a catalyst D (according to the invention)

For the preparation of catalyst D, the alumina support described in Example 1 was used.

100 g of this support were impregnated with 100 ml of an aqueous solution of vanadyl oxalate, obtained by dissolving 4.2 g of vanadium pentoxide in an oxalic acid solution.

After 30 min of contact time, the product obtained was dried in an oven at 120° C. for 4 hours before being calcined for 4 hours at 450° C. under air.

The catalyst D thereby prepared contained, by weight expressed with reference to the support, 4% of vanadium pentoxide distributed homogeneously within the alumina beads, equivalent to 1.8 vanadium atoms per square nanometer.

EXAMPLE 5
Preparation of a catalyst E* (Comparative example)

For the preparation of catalyst E*, the alumina support described in Example 1 was used.

100 g of this support was impregnated with 100 ml of an aqueous solution of vanadyl oxalate, obtained by dissolving 17.6 g of vanadium pentoxide in an oxalic acid solution.

After 30 min of contact time, the product obtained was dried in an oven at 120° C. for 4 hours before being calcined for 4 hours at 450° C. under air.

100 g of this product were impregnated with 100 ml of an aqueous solution of vanadyl oxalate, obtained by dissolving 11.6 g of vanadium pentoxide in an oxalic acid solution.

After 30 min of contact time, the product obtained was dried in an oven at 120° C. for 4 hours before being calcined for 4 hours at 450° C. under air.

The catalyst E* thereby prepared contained, by weight expressed with reference to the support, 25% of vanadium pentoxide distributed homogeneously within the alumina beads, equivalent to 13.9 vanadium atoms per square nanometer.

EXAMPLE 6
Preparation of a catalyst F* (Comparative example)

For the preparation of catalyst F*, titanium dioxide was employed in the form of trilobate extrudates 3 mm in diameter, having the following properties:

(a) Specific surface area=155 m$^2$/g, (b) Total pore volume=30 cm$^3$/100 g, (c) Pore volume for pores larger than 1,000 Å in diameter=6 cm$^2$/100 g, (d) Pore volume for pores larger than 300 Å in diameter= 17 cm$^3$/100 g.

100 g of this support were impregnated with 30 ml of an aqueous solution of vanadyl oxalate, obtained by dissolving 4.4 g of vanadium pentoxide in an oxalic acid solution.

After 30 min of contact time, the product obtained was dried in an oven at 120° C. for 4 hours before being calcined for 4 hours at 450° C. under air.

The product obtained was impregnated with 30 ml of an aqueous solution of vanadyl oxalate, obtained by dissolving 4.4 g of vanadium pentoxide in an oxalic acid solution.

After 30 min of contact time, the product obtained was dried in an oven at 120° C. for 4 hours before being calcined for 4 hours at 450° C. under air.

The product thereby obtained was impregnated with 30 ml of an aqueous solution of vanadyl oxalate, obtained by dissolving 4.4 g of vanadium pentoxide in an oxalic acid solution.

After 30 min of contact time, the product obtained was dried in an oven at 120° C. for 4 hours before being calcined for 4 hours at 450° C. under air.

The product thereby obtained was impregnated with 30 ml of an aqueous solution of vanadyl oxalate, obtained by dissolving 4.4 g of vanadium pentoxide in an oxalic acid solution.

After 30 min of contact time, the product obtained was dried in an oven at 120° C. for 4 hours before being calcined for 4 hours at 450° C. under air.

The catalyst F* thereby prepared had a specific surface area of 70 m²/g and contained, by weight expressed with reference to the support, 15% of vanadium pentoxide distributed homogeneously within the titanium dioxide extrudates, equivalent to 17 vanadium atoms per square nanometer.

EXAMPLE 7

Preparation of a catalyst G (according to the invention)

For the preparation of catalyst G, the titanium dioxide support described in Example 6 was used.

100 g of this support were impregnated with 30 ml of an aqueous solution of vanadyl oxalate, obtained by dissolving 4.2 g of vanadium pentoxide in an oxalic acid solution.

After 30 min of contact time, the product obtained was dried in an oven at 120° C. for 4 hours before being calcined for 4 hours at 450° C. under air.

The catalyst G thereby prepared had a specific surface area of 88 m²/g and contained, by weight expressed with reference to the support, 4% of vanadium pentoxide distributed homogeneously within the titanium dioxide extrudates, equivalent to 3.1 vanadium atoms per square nanometer.

EXAMPLE 8

Characterization of the catalysts

The catalysts A, B, C, D, E*, G and F* prepared as described in the above examples were characterized by Raman spectroscopy.

The Raman spectra of the catalysts were recorded using a Ramonor HG2S apparatus under the following conditions:

(1) Excitation wavelength: 514.5 nm,
(2) Laser power: 300 mW,
(3) Spectral range: 800.0 to 1200.0 cm$^{-1}$,
(4) Slit width: 400 μm,
(5) Spectral slit width: 3.49 cm$^{-1}$,
(6) Scanning rate: 130 cm$^{-1}$/min,
(7) Time constant: 6,
(8) Number of scans: 3.

In the spectra of the catalysts E* and F* prepared for comparative purposes, the presence was noted of lines characteristic of microcrystalline vanadium oxides at 1,000, 700, 535 and 400 cm$^{-1}$. These lines were absent in the case of the catalysts A to D and G according to the invention.

EXAMPLE 9

Evaluation of the catalysts A, B, C, D, E* and G*

The catalysts prepared in the above examples were tested to determine the efficacy of removal of $NO_x$ and the formation of $N_2O$, in an installation including pressure- and flowrate-regulated sources of NO, $NO_2$, $NH_3$, $H_2O$ and $N_2$. The gas stream resulting from the mixture of gases was introduced into a reactor containing a volume of 25 cm³ of catalyst and was then transferred into an apparatus for measuring $NO_x$ by chemiluminescence and measuring $N_2O$ by gas chromatography.

The efficacy of removal of $NO_x$ was measured by the following equation:

$$\text{Degree of removal of } NO_x (\%) = \frac{NO_x \text{ inlet} - NO_x \text{ outlet}}{NO_x \text{ outlet}} \times 100$$

in which:

$NO_x$ inlet=concentration of $NO_x$ introduced into the reactor $NO_x$ outlet=concentration of $NO_x$ exiting from the reactor The results obtained are reported in Table I, using a mixture of gases containing:

(i) 0.2% by volume of $NO_x$,
(ii) A variable amount of $NH_3$ (0.195% to 0.600% by volume), adjusted to provide an $NH_3$ concentration at outlet of less than 10$^{-4}$% by volume,
(iii) 3% by volume of $O_2$,
(iv) Remainder $N_2$, with an hourly space velocity of 8,000 h$^{-1}$, the pressure of the gases to be treated being 4 bar absolute.

Table II reports the amount of ammonia introduced at 420° C., and Table III shows the amount of $N_2O$ formed at 370° and 420° C. with the catalysts A, B, C, D, E*, F* and G.

TABLE I

| Gas temp. (°C.) | Degree of reduction of $NO_x$ (%) on the catalysts | | | | | | |
|---|---|---|---|---|---|---|---|
| | A | B | C | D | E* | F* | G |
| 250 | 99 | 99 | 99 | 70 | 98 | 98 | 85 |
| 300 | 100 | 100 | 100 | 85 | 99 | 100 | 92 |
| 370 | 100 | 100 | 100 | 95 | 100 | 100 | 98 |
| 400 | 100 | 100 | 100 | 98 | 100 | 95 | 100 |
| 420 | 100 | 100 | 100 | 100 | 100 | 90 | 100 |

TABLE II

| Gas temp. (°C.) | $NH_3$ injected (%) onto the catalysts | | | | | | |
|---|---|---|---|---|---|---|---|
| | A | B | C | D | E* | F* | G |
| 420 | 0.320 | 0.230 | 0.205 | 0.195 | 0.465 | 0.600 | 0.205 |

TABLE III

| Gas temp. (°C.) | $N_2O$ formed on the catalysts (% × 10$^{-4}$) | | | | | | |
|---|---|---|---|---|---|---|---|
| | A | B | C | D | E* | F* | G |
| 370 | 50 | 30 | 20 | 0 | 100 | 400 | 15 |
| 420 | 160 | 110 | 90 | 40 | 250 | 1500 | 80 |

The results reported in Table I evidence that the catalysts according to the invention exhibited performances in respect of removal of $NO_x$ which were equally as good as those of the catalysts prepared for comparative purposes.

The results reported in Table II evidence that the catalysts according to the invention consumed far less ammonia than the catalysts prepared for comparative purposes.

The results reported in Table III evidence that the catalysts according to the invention formed far less $N_2O$ than the catalysts prepared for comparative purposes.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the purification of a gas stream containing contaminating amounts of nitrogen oxides $NO_x$, comprising contacting such gas stream, in the presence of ammonia, with a catalyst composition and thereby selectively reducing said $NO_x$ values, wherein said catalyst composition comprises an inorganic oxide support substrate having a catalytically effective amount of a metal oxide active phase deposited thereon, said support substrate comprising at least one alumina, aluminate, titanium dioxide and/or zirconium dioxide and said catalytically active phase comprising at least one vanadium oxide and/or molybdenum oxide and/or tungsten oxide, the surface of said support substrate being chemically bonded to the metals V and/or Mo and/or W and said catalyst being devoid of $V_2O_3$ and/or $MoO_3$ and/or $WO_3$ crystalline phases.

2. The process as defined by claim 1, carried out at a temperature of at least 300° C.

3. The process as defined by claim 2, carried out at a temperature ranging from 300° to 550° C.

4. The process as defined by claim 3, carried out at a temperature ranging from 350° to 450° C.

5. The process as defined by claim 1, carried out such that the $NH_3/NO_x$ molecular ratio ranges from 0.8 to 1.

6. The process as defined by claim 1, wherein the pressure of said gas stream ranges from 1 to 20 bar.

7. The process as defined by claim 10, wherein the HSV of said gas stream ranges from 2,000 to 150,000 $h^{-1}$.

8. The process as defined by claim 1, said gas stream comprising nitrogen, from 1% to 10% by volume of oxygen, from 0.01% to 1% by volume of $NO_x$, from 0% to 1% by volume of sulfur oxides $SO_x$ and from 0.001% to 20% by volume of water.

9. The process as defined by claim 1, the support substrate of said catalyst composition comprising an alumina or aluminate and the catalytically active phase comprising a vanadium oxide, wherein the number X of vanadium atoms per square nanometer thereof is less than or equal to 9 and less than or equal to the value $X_o$, dependent on the process temperature T in kelvin, on the contact time $t_c$ relative to standard conditions of temperature and pressure, on the pressure P and on the molar concentration $C_{H_2O}$ of water, the value $X_o$ being provided by the equation:

$$X_o=[-58.0+4.65\times10^4\times1/T]t_c^{1.58}\times p^{0.26}[1+5.2C_{H_2O}]^{0.40}$$

in which $C_{H_2O}$ ranges from 0 to 0.3 mol of water per mole of gas treated, $t_c$ ranges from 0.1 to 1 second, p ranges from 1 to 15 bar, and T ranges from 580° to 800° K.

10. The process as defined by claim 1, wherein support substrate comprises alumina and said catalytically active phase comprises vanadium oxide, the surface of said support substrate being chemically bonded to the metal V and said catalyst being devoid of $V_2O_3$ crystalline phases.

11. The process as defined by claim 1, wherein the catalyst composition exhibits a Raman spectrum showing the presence of lines characteristic of vanadates, molybdates or tungstates, whether or not polymerized, in the frequency range 850–980 $cm^{-1}$ and 220–370 $cm^{-1}$, and the absence of lines characteristic of crystalline vanadium oxide at 1,000, 700, 535 and 400 $cm^{-1}$, of crystalline molybdenum oxide at 1,000, 815, 665 and 280 $cm^{-1}$ and of crystalline tungsten oxide at 810, 715 and 270 $cm^{-1}$.

12. The process as defined by claim 1, wherein the catalyst composition comprises only vanadate, molybdate and/or tungstate groups, whether or not polymerized, at the surface of said support substrate.

13. The process as defined by claim 1, wherein said support substrate comprises an alumina or aluminate and the metal element M of said metal oxide is chemically bonded thereto via Al—O-M bonds.

14. The process as defined by claim 1, wherein said support substrate is coated with fewer than X atoms of vanadium and/or Y atoms of molybdenum and/or tungsten per square nanometer thereof, according to the relationships wherein X is less than or equal to 9, Y is less than or equal to 6, X is less than or equal to $(1-Y/6)\times9$, and Y is less than or equal to $(1-X/9)\times6$.

15. The process as defined by claim 1, wherein the catalyst composition comprises from 0.01% to 50% by weight of said catalytically active phase relative to the total weight of the catalyst.

16. The process as defined by claim 1, wherein said catalytically active phase comprises vanadium oxide $V_2O_5$ or a mixture of vanadium oxide $V_2O_5$ with a molybdenum oxide $MoO_3$ or a tungsten oxide $WO_3$, in a weight ratio of $V_2O_5$ to $MoO_3$ or $WO_3$ ranging from 1 to 0.01.

17. The process as defined by claim 1, wherein said support substrate comprises an alumina or aluminate having a pore volume of pores larger than 1,000 Å in diameter of greater than 25 $cm^3/100$ g, a pore volume of pores larger than 300 Å in diameter of greater than 40 $cm^3/100$ g, and a total pore volume ranging from 80 to 120 $cm^3/100$ g.

18. The process as defined by claim 1, wherein the specific surface area of said support substrate ranges from 5 to 200 $m^2/g$.

* * * * *